UNITED STATES PATENT OFFICE.

JOHN W. SUTTON, OF AKRON, OHIO.

IMPROVEMENT IN THE MANUFACTURE OF INDIA-RUBBER GOODS.

Specification forming part of Letters Patent No. 132,186, dated October 15, 1872.

*To all whom it may concern:*

Be it known that I, JOHN W. SUTTON, of Akron, in the county of Summit and State of Ohio, have invented an Improvement in the Manufacture of India-Rubber Goods, of which the following is a specification:

My invention relates to all that class of rubber goods wherein cloth or canvas is used to give strength to the manufactured article; and the object of my invention is to afford a means of preventing a decay of this canvas or cloth, which destroys its fiber and renders it worthless for the purpose for which it was used, for it is a well-known fact that this class of goods, in many instances, becomes in a short time weak and unfitted for the purpose for which they were manufactured.

From observation and experiment I have discovered that this result arises from a decay of the canvas or cloth, caused by its becoming damp or wet and drying without air, similarly to the dry rot in timber.

I adopt the following method to prevent this: Soak the cloth or canvas in a solution of glue; remove the cloth or canvas, and when dry soak it in the ordinary tannin solution; again dry the cloth and use it in the manufacture of rubber goods in the usual way.

Other solutions besides glue may be used to afford gelatine to the cloth or canvas before tanning. By this process the cloth is impregnated with a substance insoluble in water, and which severe tests have proved to perfectly accomplish the desired object.

I do not claim as new the process of tanning cloth substantially as above described, nor do I claim as my invention the use of preservative substances in the manufacture of India-rubber goods to prevent the decay either of the rubber or the cloth incident to that class of goods, as patents have already been granted to John Murphy, of New York, on February 15, 1870, and to Thomas J. Mayall, of Roxbury, Massachusetts, of date November 29, 1859, to accomplish this object; but

What I claim, and desire to secure by Letters Patent, is—

The application of cloth tanned in the aforesaid or equivalent manner to the manufacture of rubber goods, as and for the purpose set forth.

JOHN W. SUTTON.

Witnesses:
 B. F. GOODRICH,
 HARVEY W. LEW.